United States Patent
Goto et al.

(10) Patent No.: US 8,960,834 B2
(45) Date of Patent: Feb. 24, 2015

(54) INKJET PRINTING APPARATUS USING PRINT HEAD WITH OVERLAPPING NOZZLE ARRAYS

(75) Inventors: Fumitaka Goto, Tokyo (JP); Nobutaka Miyake, Yokohama (JP); Tohru Ikeda, Yokohama (JP); Akitoshi Yamada, Yokohama (JP); Mitsuhiro Ono, Tokyo (JP); Ryosuke Iguchi, Kawasaki (JP); Hidetsugu Kagawa, Kawasaki (JP); Tomokazu Ishikawa, Yokohama (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/247,309

(22) Filed: Sep. 28, 2011

(65) Prior Publication Data

US 2012/0081439 A1   Apr. 5, 2012

(30) Foreign Application Priority Data

Oct. 5, 2010   (JP) .................................. 2010-225744

(51) Int. Cl.
*B41J 29/38*   (2006.01)
*B41J 2/21*   (2006.01)
*G06K 15/10*   (2006.01)

(52) U.S. Cl.
CPC ............. *B41J 2/2146* (2013.01); *G06K 15/102* (2013.01); *G06K 2215/111* (2013.01)
USPC .......................................................... 347/14

(58) Field of Classification Search
None
See application file for complete search history.

(56) References Cited

U.S. PATENT DOCUMENTS

| 5,276,459 A * | 1/1994 | Danzuka et al. ............. 346/33 A |
| 2006/0214957 A1 * | 9/2006 | Wada ................................ 347/5 |
| 2008/0218547 A1 | 9/2008 | Takamiya et al. |

(Continued)

FOREIGN PATENT DOCUMENTS

| JP | 04-072869 A | 3/1992 |
| JP | 10-013674 A | 1/1998 |

(Continued)

OTHER PUBLICATIONS

Notification of the First Office Action dated Nov. 6, 2013, in Chinese Application No. 201110306352.6.
Office Action in Japanese Patent Application No. 2010-225744, dated Apr. 8, 2014.

*Primary Examiner* — Geoffrey Mruk
*Assistant Examiner* — Bradley Thies
(74) *Attorney, Agent, or Firm* — Fitzpatrick, Cella, Harper & Scinto

(57) ABSTRACT

The memory size and processing time for the correction of image data carried out to reduce image deterioration caused by nozzle ejection characteristic variation in an inkjet printing apparatus can be minimized. Print heads are provided with pluralities of chips that have nozzle arrays formed from a plurality of nozzles. Overlap portions and non-overlap portions are formed on each chip. An image processing apparatus sets input image data, corresponding to nozzle regions that are defined in nozzle arrays along the alignment direction of the nozzles of the print head and that are composed of a plurality of nozzles, as processing blocks. The input image data is processed according to parameters defined for each of those processing blocks. The boundaries of the nozzle regions corresponding to the input image data of the processing blocks are established according to the boundaries of the overlap portions and the non-overlap portions.

11 Claims, 13 Drawing Sheets

(56) References Cited

U.S. PATENT DOCUMENTS

| | | | |
|---|---|---|---|
| 2009/0278882 A1* | 11/2009 | Yoshida et al. | 347/19 |
| 2010/0134545 A1* | 6/2010 | Murai et al. | 347/13 |
| 2010/0321434 A1* | 12/2010 | Baba | 347/12 |
| 2011/0285780 A1 | 11/2011 | Yamada et al. | |
| 2011/0286020 A1 | 11/2011 | Ishikawa et al. | |

FOREIGN PATENT DOCUMENTS

| | | | |
|---|---|---|---|
| JP | 2006-044111 A | | 2/2006 |
| JP | 2006044111 A | * | 2/2006 |
| JP | 2006-264152 A | | 10/2006 |

* cited by examiner

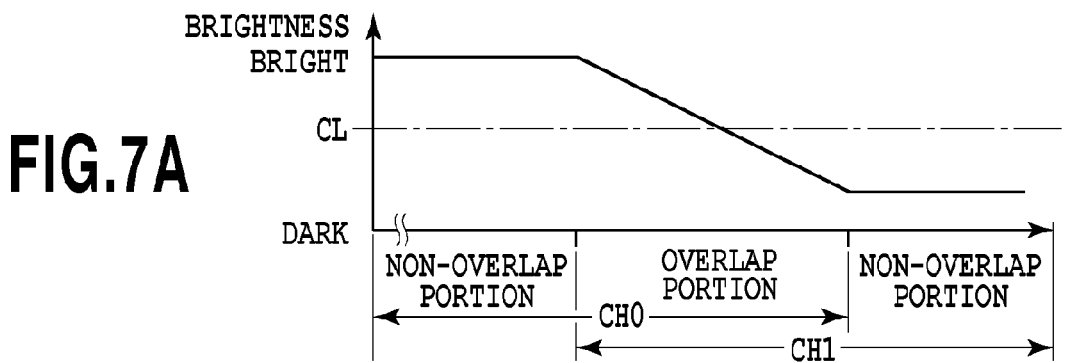
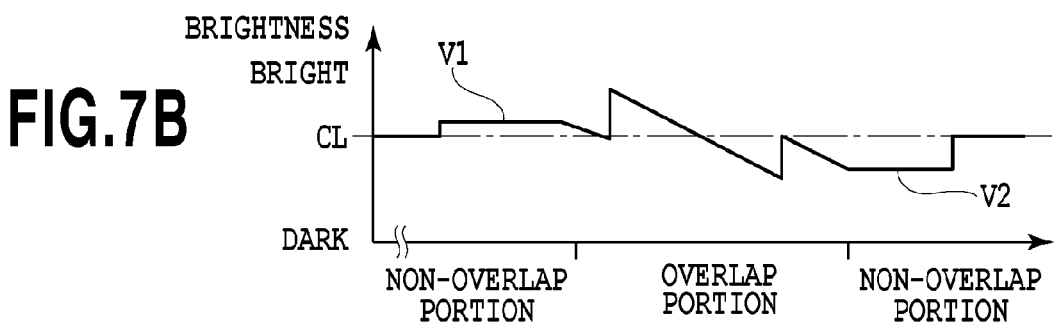
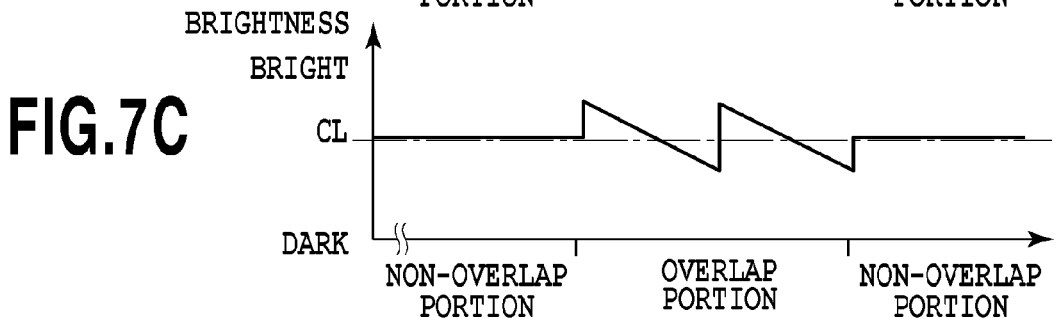
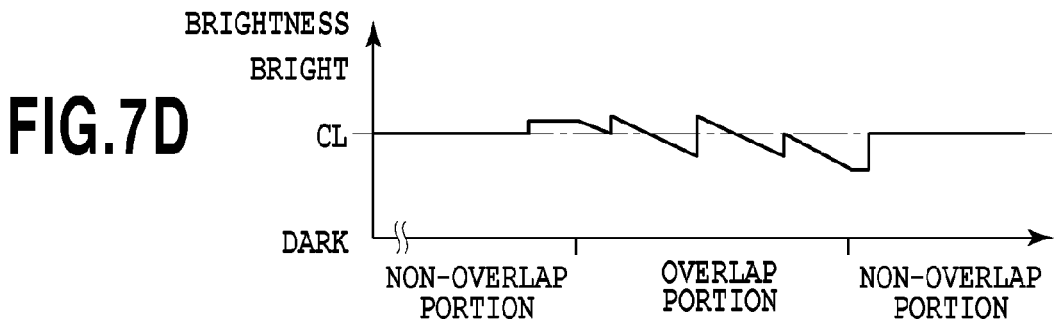
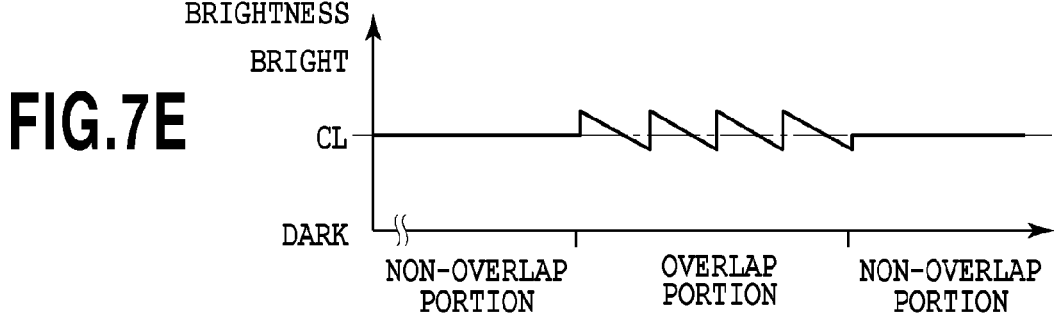

INKJET PRINTING APPARATUS USING PRINT HEAD WITH OVERLAPPING NOZZLE ARRAYS

BACKGROUND OF THE INVENTION

1. Field of the Invention

The invention relates to inkjet printing apparatuses that print images using print heads on which pluralities of chips provided with multiple ink ejecting nozzles are aligned along the alignment direction of the nozzles, and to image processing apparatuses, etc., that process data used thereby.

2. Description of the Related Art

As for inkjet printing apparatuses, print heads are used that have ejection portions (hereafter these ejection portions will also be referred to as nozzles) that are aligned in a constant direction and that are composed of inkjet printing elements, ejection ports, and liquid paths in communication therewith. As for inkjet printing apparatuses, so-called full-line type inkjet printing apparatuses are known, which perform printing operations by way of fixing the print heads with respect to the main body of the printing apparatus and conveying the print medium in a direction that crosses the long side of the print head. Full-line type inkjet printing apparatuses are capable of forming images over the whole area of the print medium at a high speed by way of conveying the print medium in succession while printing batched 1-line image portions at the long print heads.

So-called coupled-heads are used as the print heads of such full line type inkjet printing apparatuses, which are made long by way of aligning, at a high precision, a plurality of long chips that are capable of being manufactured at a comparatively low price (refer to Japanese Patent Laid-Open No. 2006-264152). Implementing color image formation using such coupled-heads becomes possible by way of lining up a plurality of coupled-heads that correspond to inks each having different colors such as black (K), cyan (C), magenta (M), and yellow (Y), etc.

Print heads that are used in inkjet type printing apparatuses have ejection amount variations among the multiple nozzles, due to manufacturing errors, etc. When there is ejection amount variation such as this it is easy for density unevenness to occur in printed images.

Conventionally, it is known to use head shading (HS) techniques, such as that disclosed in Japanese Patent Laid-Open No. H10-13674 (1998), as processes that reduce such density unevenness. Head shading techniques correct image data according to information pertaining to the ejection amount of each nozzle. By way of this correction it is possible to increase and decrease the final number of printed ink dots, and to perform the adjustment of density in a printed image.

However, in the case where head shading techniques such as those described in Japanese Patent Laid-Open No. H10-13674 (1998) are applied to a long print head having many nozzles, because image data processing is carried out at each nozzle, a problem arises wherein a large amount of time is necessary for correction processing. There is also a problem wherein a large amount of memory capacity becomes necessary when correcting images using head shading technique, which brings about an increase in cost. Furthermore, when the resolution of the nozzles of the print head is made high, it is also required that the resolution of the detection device that detects the ejection amount of each nozzle must also be high, which also causes an increase in apparatus cost.

SUMMARY OF THE INVENTION

An object of the invention is to enable image data correction for reducing image deterioration caused by nozzle ejection characteristic variation in an ink jet printing apparatus, while at the same time limiting the increase of necessary memory and processing time.

In order to provide a solution to the above described problems, certain aspects of the invention comprise the characteristics set forth below.

A first aspect of the invention is an inkjet printing apparatus that prints images on a print medium by ejecting ink from nozzles based on print data generated in response to input image data, using at least one print head that is provided with a plurality of chips, the plurality of chips each having at least one nozzle array comprising a plurality of nozzles that eject ink, the nozzle array of each chip having an overlap portion and a non-overlap portion; wherein a print region printed by an overlap portion of a nozzle array of a chip overlaps a print region printed by an overlap portion of a nozzle array of a chip adjacent to the chip and, wherein a print region printed by a non-overlap portion of a nozzle array of a print chip does not overlap a print region printed by a non-overlap portion of a nozzle array of a chip adjacent to the chip; the inkjet printing apparatus comprising: a correction unit that sets input image data, which correspond to nozzle regions that are defined in the nozzle arrays along the alignment direction of the nozzles and each of the nozzle regions being composed of a plurality of nozzles, as processing blocks, and corrects the input image data according to parameters that are defined for each of the processing blocks; wherein the nozzle regions that correspond to the input image data of the processing blocks are defined according to the positions of the boundaries of the overlap portions and non-overlap portions on the print head.

A second aspect of the invention is an image processing method for input image data processing for performing printing using at least one print head that is provided with a plurality of chips, the plurality of chips each having at least one nozzle array comprising a plurality of nozzles that eject ink, each nozzle array of the chip having an overlap portion and a non-overlap portion; wherein a print region printed by an overlap portion of a nozzle array of a chip overlaps a print region printed by an overlap portion of a nozzle array of a chip adjacent to the chip, and wherein a print region printed by a non-overlap portion of a nozzle array of a print chip does not overlap a print region printed by a non-overlap portion of a nozzle array of a chip adjacent to the chip; the image processing method comprising: a setting step that sets input image data, which correspond to nozzle regions that are defined in the nozzle arrays along the alignment direction of the nozzles and each of the nozzle regions being composed of a plurality of nozzles, as processing blocks; and a correcting step that corrects the input image data according to parameters that are defined for each of the processing blocks by the setting step; wherein the setting step defines the nozzle regions that correspond to the input image data of the processing blocks, according to the positions of the boundaries of the overlap portions and non-overlap portions on the print head.

According to the invention, image data correction that reduces image deterioration caused by nozzle ejection characteristic variation in an ink jet printing apparatus, while at the same time limiting the increase of necessary memory and processing time, has been enabled.

Further features of the present invention will become apparent from the following description of exemplary embodiments (with reference to the attached drawings).

BRIEF DESCRIPTION OF THE DRAWINGS

FIGS. 7A to 7E are diagrams that illustrate brightness at the overlap portions and non-overlap portions of the print heads shown in FIGS. 4A and 4B;

DESCRIPTION OF THE EMBODIMENTS

Figure 1:
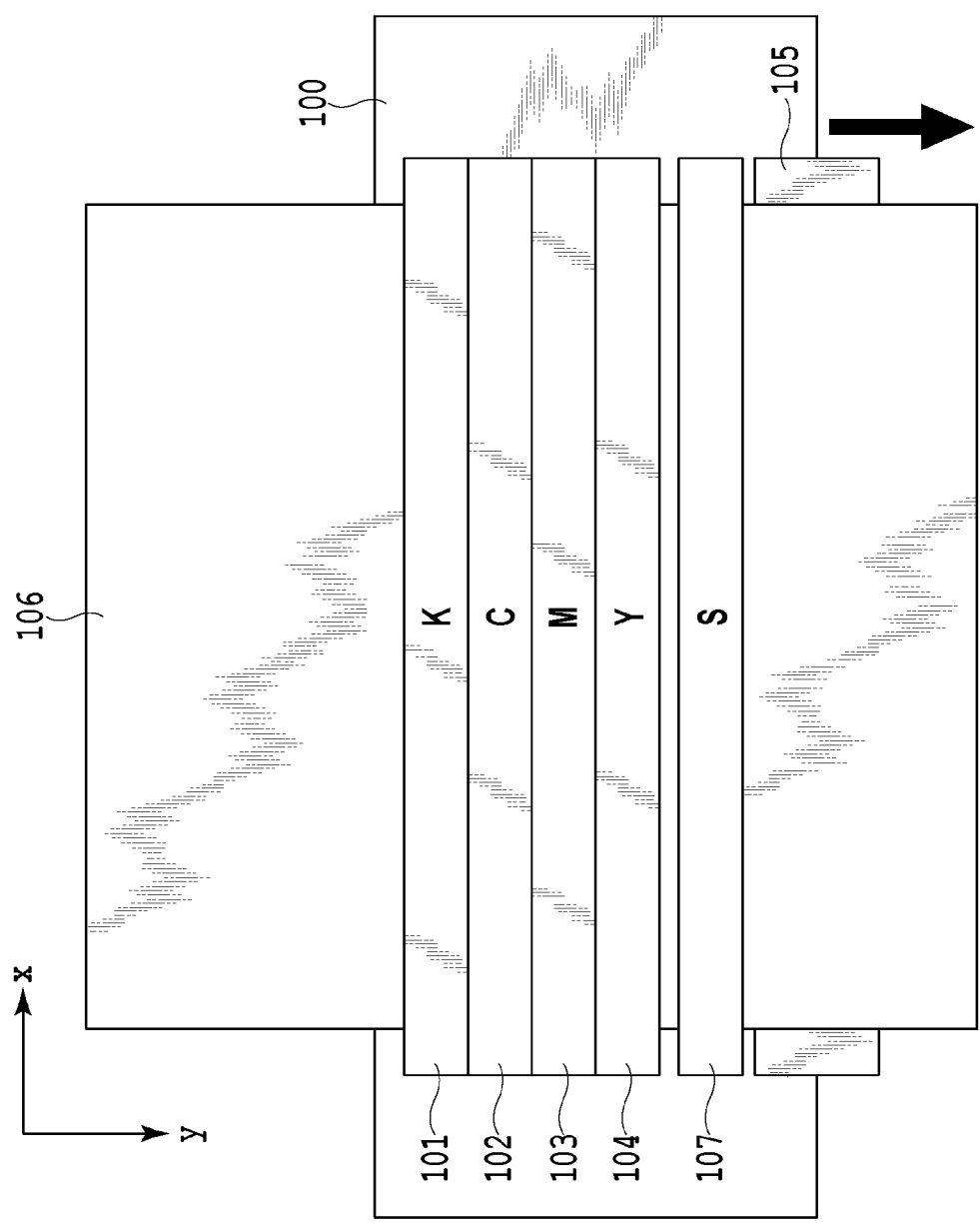
FIG. 1 is a diagram that schematically illustrates the ink jet printing apparatus of a first embodiment of the invention.

Embodiments of the invention will be described in detail below while referring to the drawings.

FIG. 1 is a diagram that schematically illustrates the printer of the inkjet printing apparatus of a first embodiment of the invention. As shown at FIG. 1, the printer 100 has print heads 101 to 104 provided on a frame that forms a structural member of the printer. It is a so-called full-line type apparatus wherein the print heads 101 to 104 each have a plurality of nozzles, which are for respectively ejecting a plurality of inks, cyan (C), magenta (M), yellow (Y) and black (K), aligned along a prescribed direction at a distance corresponding to the width of the print paper 106. The nozzles of the respective nozzle arrays are aligned at a resolution of 1200 dpi. A scanner 107 (a color-information acquisition means), which acquires color information with respect to images printed by the print heads 101 to 104, etc., is also provided on the print head 100, parallel to the print head 104. Note that the scanner 107 of the embodiments has a resolution of 1200 dpi.

The print paper 106, which serves as a printing medium, is conveyed in the direction of the arrow of the diagram by a conveying roller 105 (and another unshown roller) that is rotated by the driving force of a motor (not shown). While the print paper 106 is conveyed, ink is ejected from the multiple nozzles of each of the print heads 101 to 104, according to printing data, and thereby raster images that correspond to the nozzle arrays of the respective printing heads are sequentially printed. By repeating such ink ejection operation from each of the printing heads onto the conveyed print paper a one-page image can be printed, for example. Note that the printing apparatuses to which the present invention can be applied are not limited to full-line type printers as described above. As is clear from the explanation below, the invention may also be applied, for example, to a so-called serial type printing apparatus that performs printing by scanning a print head in a direction that crosses the direction of conveyance of the print paper.

Figure 2:
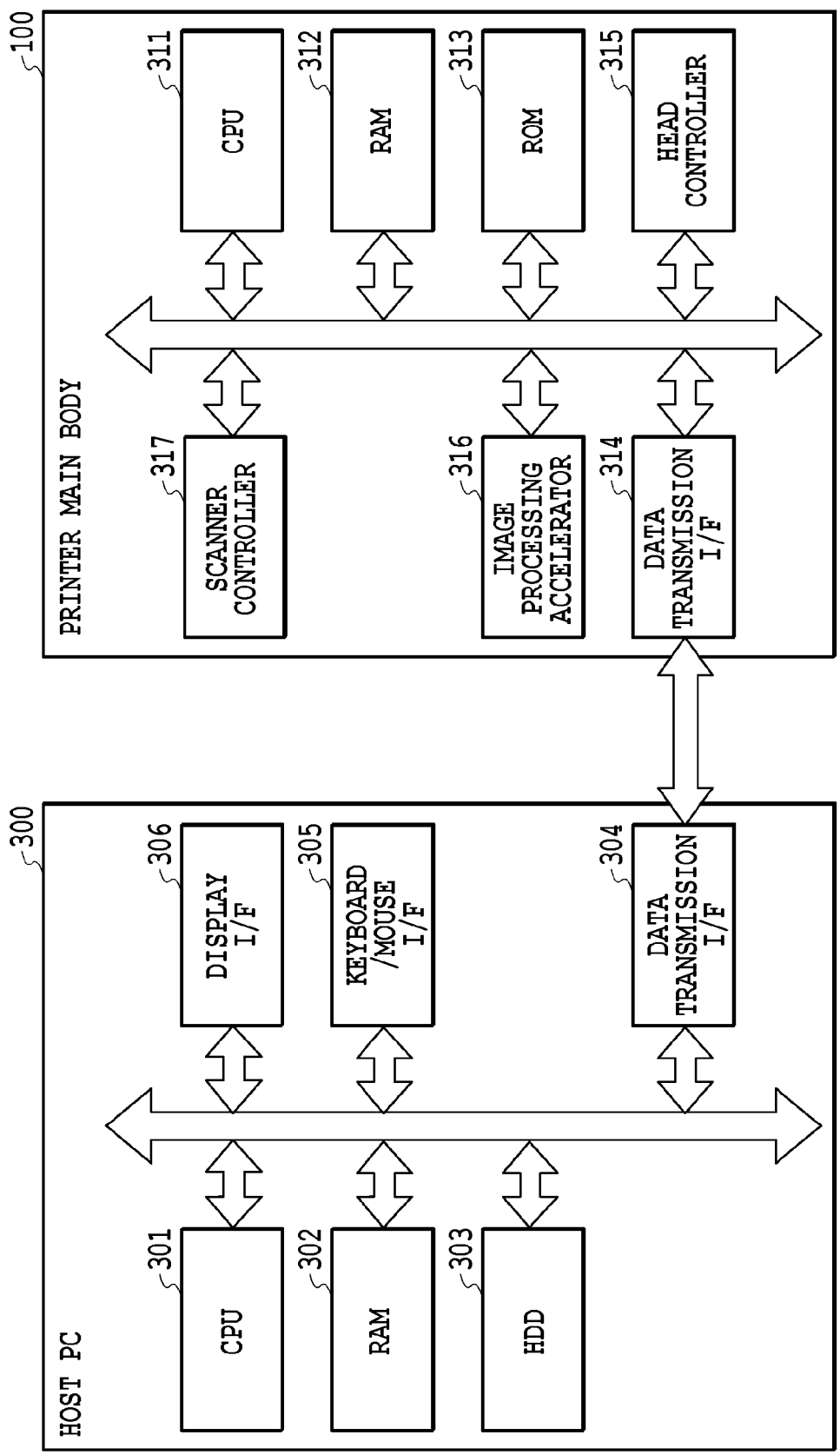
FIG. 2 is a block diagram illustrating a printing system according to one embodiment of the present invention.

FIG. 2 is a block diagram illustrating a printing system according to one embodiment of the present invention. As illustrated in the diagram, the printing system is configured to have the printer 100 shown in FIG. 1, and a personal computer (PC) 300 that serves as its host device.

The host PC 300 is configured to have the elements described below as main components. The CPU 301 performs later described processing according to programs stored in the HDD 303 or RAM 302, which serve as storage units. For example, the CPU functions as a conversion data generation unit and switching unit that perform a later described conversion data generation step and table switching step, etc. The RAM 302 is volatile storage, and temporarily stores programs and data. The HDD 303 is nonvolatile storage, and stores programs and data as well. The data transfer I/F (interface) 304 controls data transmission and reception to and from the printer 100. A USB, IEEE 1394, LAN, etc., can be used as the connection method for the data transmission and reception. The keyboard/mouse I/F 305 is an I/F that controls HIDs (Human Interface Devices) such as a keyboard and mouse. A user can provide input through the I/F. The display I/F 306 controls what is indicated on a display (not shown). The scanner controller 317 controls driving of the above-described scanner 107 based on control signals from the CPU 311.

On the other hand, the printer 100 is configured to have the following as main components. The CPU 311 performs processing of each of the embodiments to be described at FIG. 3 and thereafter, according to programs stored in the ROM 313 and RAM 312. The RAM 312 is volatile storage, and temporarily stores programs and data. The ROM 313 is nonvolatile storage, and the ROM 313 can store table data generated by the processes of the respective embodiments to be described at FIG. 3 and thereafter.

A data transfer I/F 314 controls data transmission and reception to and from the PC 300. Ahead controller 315 supplies print data to the respective print heads 101 to 104 illustrated in FIG. 1, and also controls the ejection operation of the print heads. Specifically, the head controller 315 can be configured to read control parameters and print data from a predetermined address of the RAM 312. When the CPU 311 writes control parameters and print data at the above predetermined address of the RAM 312, processing is activated by the head controller 315, and ink ejection from the print head is performed. An image processing accelerator 316 consists of hardware, and performs image processing faster than the CPU 311. Specifically, the image processing accelerator 316 can be configured to read, from a predetermined address of the RAM 312, parameters and data necessary for image processing. When the CPU 311 writes parameters and data to the above predetermined address of the RAM 312 the image processing accelerator 316 is activated and prescribed image processing is performed. In the embodiments, processes, which generate table parameters (conversion data) used at the MCS processing unit described later at the respective embodiments of FIGS. 4A and 4B and thereafter, are performed by software at the CPU 311. On the other hand, print image processing, which includes processing at the MCS processing unit, is performed by hardware processes at the image processing accelerator 316. Note that the image processing accelerator 316 is not necessarily a needed component. Depending on the printer specifications, the above table parameter generation processing and image processing may be carried out by the CPU 311 only.

First Embodiment

Figure 3:
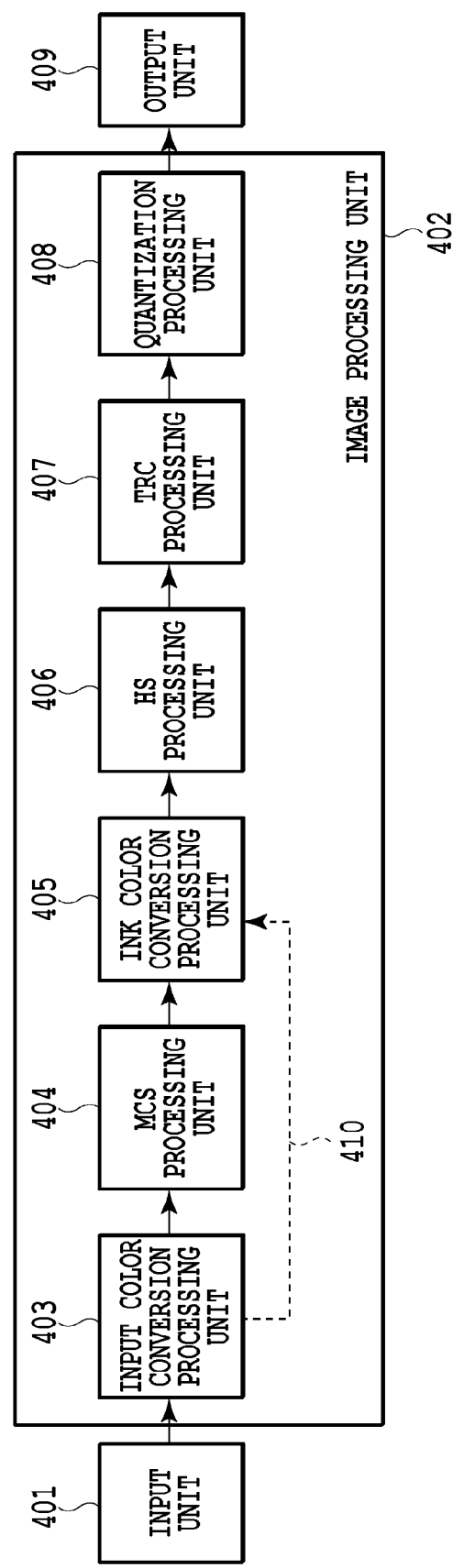
FIG. 3 is a block diagram illustrating the configuration of an image processing unit of an inkjet printer of a first embodiment of the present invention.

FIG. 3 is a block diagram illustrating the configuration of an image processing unit of an inkjet printer of a first embodiment of the invention. In this embodiment, the respective components for the control and processes of the printer 100 illustrated at FIG. 2 constitute the image processing unit. Note that the applicability of the invention is not limited to this configuration. As examples, the image processing unit may be arranged in the PC 300 shown at FIG. 2, or part of the image processing unit may be arranged in the PC 300 while the remainder is arranged in the printer 100.

As shown at FIG. 3, an input unit 401 outputs image data received from the host PC 300 to the image processing unit 402. The image processing unit 402 is configured to have an input color conversion processing unit 403, a MCS processing unit 404, an ink color conversion processing unit 405, an HS processing unit 406, a TRC processing unit 407, and a quantization processing unit 408.

At the image processing unit 402, the input color conversion processing unit 403 first converts the input image data received from the input unit 401 to image data corresponding to the color reproduction range of the printer. In this embodiment, the input image data is data that indicates color coordinates (R, G, B) of a color space coordinate system such as sRGB, the colors that the monitor expresses. The input color conversion processing unit 403 converts, by way of a known processing technique such as one using a 3D LUT, input image data comprised of 8 bits each of R, G, and B data, into image data that is a color signal comprising 3 elements, that is, 10 bits each of R', G', and B' data ("10 bit R', G', and B' color signal image data"), within the color reproduction range of the printer. In this embodiment a three-dimensional lookup table (LUT) is used, and conversion processing is performed using an interpolation calculation along with the LUT. It should be noted that in this embodiment the resolution of the image data handled at the image processing unit 402 is 600 dpi, and that the resolution of the output unit 409 is 1200 dpi, as will be described later.

The MCS (Multi Color Shading) processing unit 404, as a first conversion means of this embodiment, performs a conversion operation that corrects color difference with respect to image data converted by the input color conversion processing unit 403. This process is also carried out using a conversion table (a parameter generation means) comprising a 3D lookup table. By way of this conversion process, even where there is a variation in ejection characteristics among the nozzles of the print head at the ejection unit 409 that print at the same region, it is possible to reduce color differences caused by the single ink color or multiple ink colors generated thereby. In this embodiment it is converted into respective 12 bit device color image data, which is a color signal comprising 3 elements, by way of known techniques such as a matrix calculation processing and 3D lookup table processing.

The ink color conversion processing unit 405, as a second conversion means of this embodiment, converts the respective 12 bit R, G, B image data processed by the MCS processing unit 404 into image data that is used by the printer and that comprises ink color signal data. As the printer 100 of this embodiment uses cyan (C), magenta (M), yellow (Y) and black (K) ink, the RGB signal image data is converted into image data comprising a color signal containing 14 bits each of C, M, Y, and K data ("14 bit CMYK color signal image data"). In the same manner as the above described input color conversion processing unit, this color conversion process is also performed by using an interpolation calculation in conjunction with a 3D lookup table. Note that, in the same manner as described above, matrix calculation processes, etc., can be used as other conversion methods.

By way of inputting image data that corresponds to an ink color signal, the HS (Head Shading) processing unit 406 converts, for each ink color, respective 14 bit data into 16 bit ink color signal image data in accordance with the respective ejection amounts of the plurality of nozzles constituting the print heads. That is, the HS processing unit 406 performs a process that is the same as conventional head shading processing. In this embodiment processing is performed using a 1D lookup table.

The TRC (Tone Reproduction Curve) processing unit 407 performs a correction, for each ink color, of the HS processed 16 bit ink color signal image data, to adjust the number of dots printed at the output unit 409. In general there is not a linear relationship between the number of dots printed on a print medium and the optical density of the print medium obtained by that number of dots. Thus, to make the relationship linear, the TRC processing unit 407 corrects the respective 16 bit image data to 18 bit image data and adjusts the number of dots printed on the print medium. Specifically, this process is carried out using a 1D lookup table.

The quantization processing unit 408 performs quantization processing with respect to the 18 bit ink color image data processed at the TRC processing unit 407, and generates 1 bit, 2 value data in which "1" denotes print and "0" denotes non-printing. Note that in applying the invention the form of quantization is not particularly limited. For example, it may take a form where 8 bit image data is directly converted to 2 value data (dot data), and it may also take a form where it is finally converted to 2 value data after some bits of multi-value data have been quantized once. The quantization processing method may employ an error diffusion method, and it may also employ a pseudo halftone process such as a dithering method.

The output unit 409 performs printing by driving the print head and ejecting the respective ink colors onto the print medium based on the 2 value data (dot data) obtained from the quantization. In this embodiment the output unit comprises a print mechanism provided with the print heads 101 to 104 shown at FIG. 1.

Figure 4A:
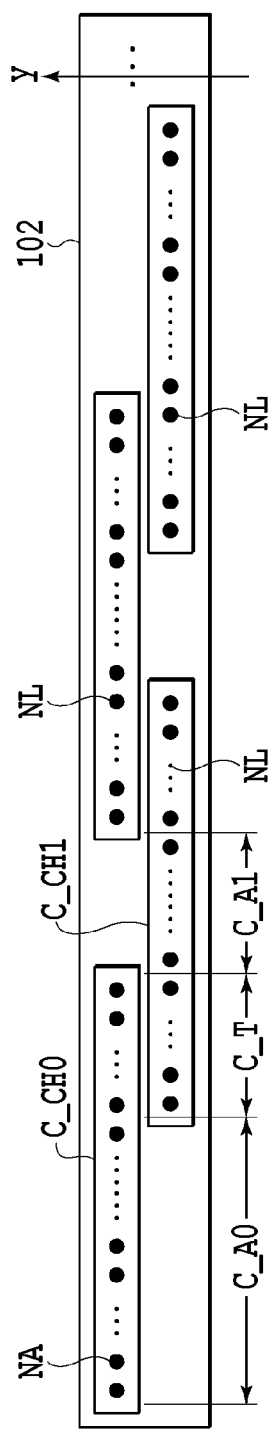
FIGS. 4A and 4B are explanatory diagrams that illustrate the configuration of print heads used in the first embodiment.
Figure 4B:
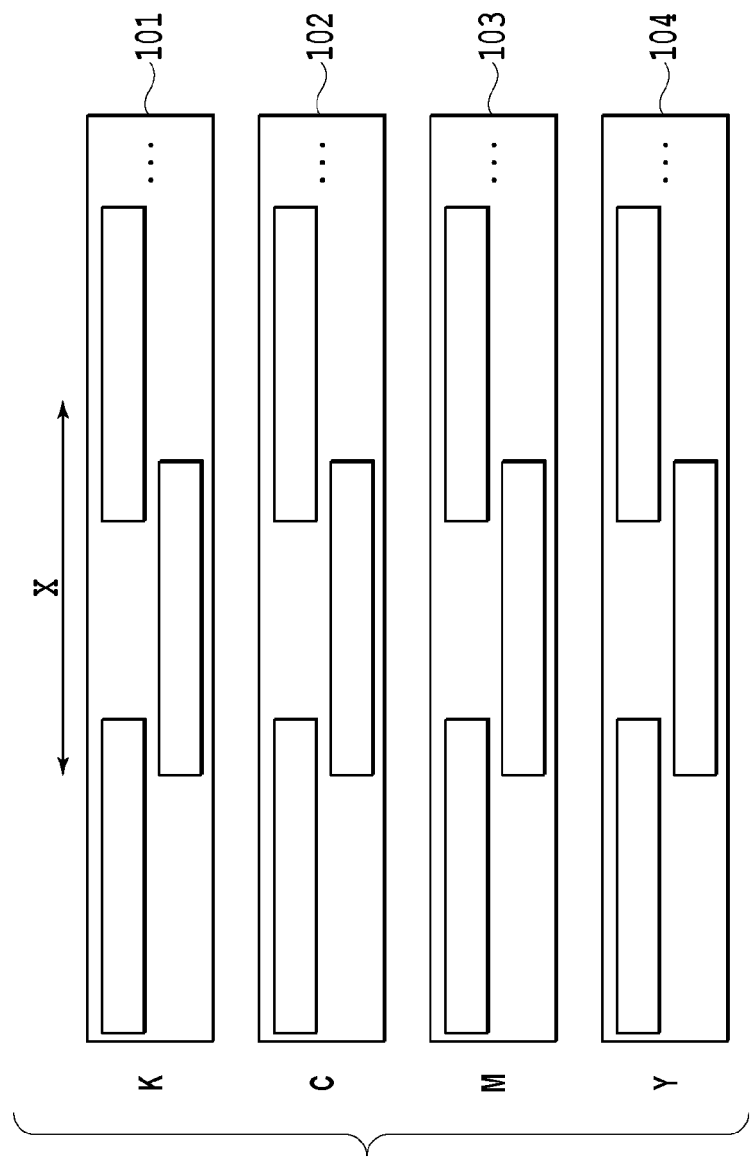

The print heads 101 to 104 that are used in this embodiment will be explained next at FIG. 4A and FIG. 4B. The print heads 101 to 104 of this embodiment are configured such that they all mutually couple the nozzle arrays of a plurality of chips, by way of connecting each of the chips, which have at least one nozzle array with a plurality of nozzles aligned therein. Explanation will be made here taking the configuration of the cyan ink ejecting print head 102 of FIGS. 4A and 4B as an example. The head chips C_CH0 and C_CH1 are arranged such as to mutually overlap fixed regions C_T away from their respective ends (overlap portions), in a direction that is perpendicular to the alignment direction of the nozzles. That is, an overlap portion of the head chip C_CH0 and an overlap portion of the head chip C_CH1, are arranged such that they have the same position along the long side direction (the x direction) of the print head 102. However, adjacent head chips are at shifted positions in the y direction, and have an overall zigzag shaped arrangement. The regions C_A0 and C_A0 shown in FIGS. 4A and 4B are non-overlap portions, which are the portions other than the overlap portions within the chips. Note that the configurations of the other print heads 101, 103 and 104 are the same as that above.

Figure 5A:
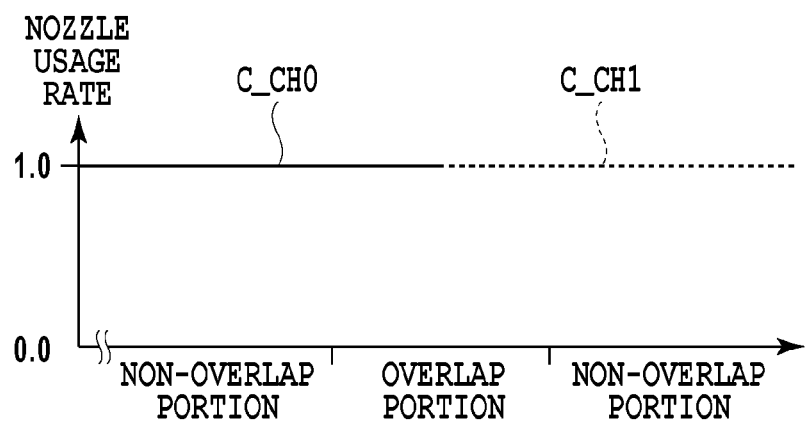
FIGS. 5A to 5C are diagrams that illustrate nozzle usage rates at the overlap portions and non-overlap portions of the print heads shown in FIGS. 4A and 4B.
Figure 5B:
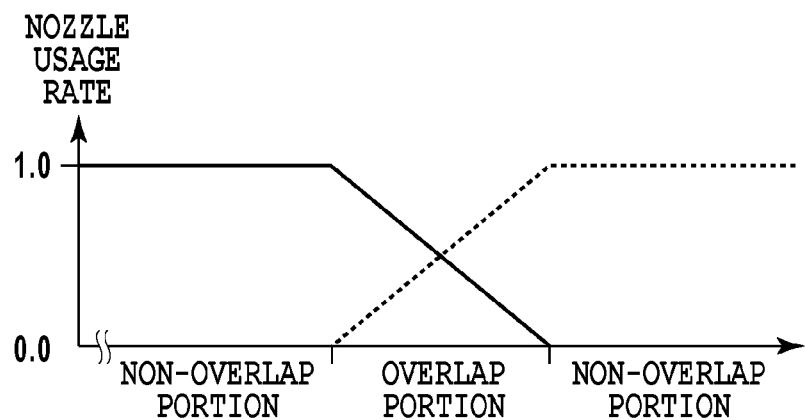
Figure 5C:
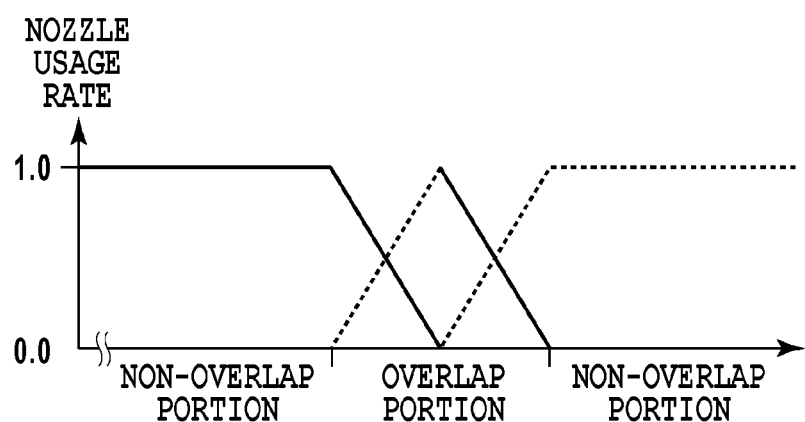

The number of nozzles of the overlap portion C_T0 per unit length along the x direction is greater than the number of nozzles of the non-overlap portion C_A0 and the non-overlap portion C_A1, per unit length along the x direction. Because of this, in the case where the nozzle usage rate at the non-overlap portions and the nozzle usage rate at the overlap portions are the same, the number of dots per unit area formed by the overlap portions is greater than the number of dots per unit area printed by the non-overlap portions. As a result, the density of the images printed by the non-overlap portions is lower than the density of the images printed by the overlap portions. Thus as shown at FIGS. 5A to 5C, the nozzle usage rate differs between overlap portions and non-overlap portions. FIG. 5A illustrates an example where the nozzle usage rate of C_CH0 (shown as a solid line), switches over to the nozzle usage rate of the overlap portion C_CH1 (shown as a dotted line), at the overlap portion of the chips shown at FIG. 4A. FIG. 5B illustrates an example where the nozzle usage rate of C_CH0 (shown as a solid line), and the nozzle usage rate of the connected C_CH1 (shown as a dotted line), cross at the overlap portion. FIG. 5C illustrates an example where the nozzle usage rate of C_CH0 (shown as a solid line), and the nozzle usage rate of the connected C_CH1 (shown as a dotted line), cross multiple times at the overlap portion. Note that nozzle usage rates of the overlap portions are not limited to the examples shown at FIGS. 5A to 5C, and that it is possible to set them to other usage rates.

The reduction of color unevenness due to print head production variation will be explained next.

Figure 6:
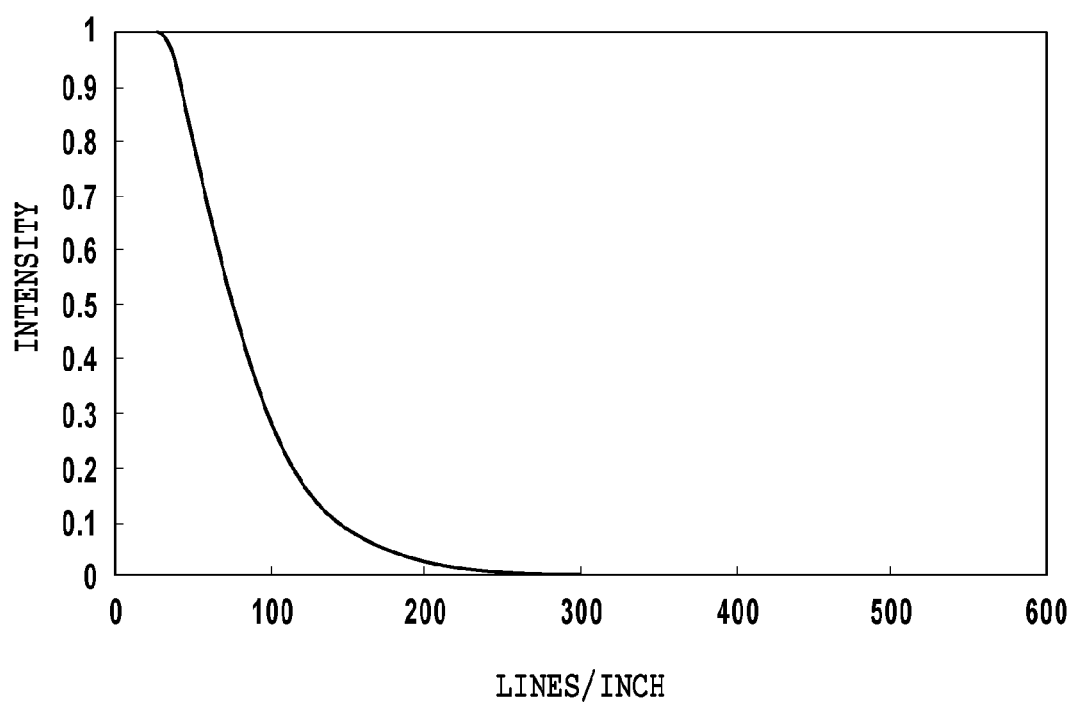
FIG. 6 is a diagram for explaining visibility.

Generally, at the HS process, the ejection amounts of each of the nozzles are detected, and an image data correction process is performed based on the detected result. Thus, in the case of a long head that has a nozzle resolution of 1200 dpi and that is associated with A4 (short side 210 mm) printing, the nozzle count is over 9900. For this reason high specifications are demanded with respect to processing speed and memory. A 1200 dpi resolution halftone line image has 600 halftone lines per inch, and from the standpoint of visibility shown at FIG. 6, it is difficult to perceive color unevenness in such images. Halftone lines are lines that have varying thickness and number of lines per unit area, and are used to vary the density of an image thereby.

With respect to the object of reducing density unevenness, application of HS processing and MCS processing, for each of the nozzles, causes the printing apparatus to go over specification when print head resolution is high. Consequently, it is preferable to make a processing block of image data, to which HS processing and MCS processing are applied, image data that corresponds to a nozzle region comprising a plurality of nozzles, rather than image data corresponding to each nozzle.

Establishment of a processing block that is ideal in correction processing, such as HS processing and MCS processing in order to improve an image, will be explained next. As described above the print heads shown at FIG. 1 are configured such that a plurality of chips are connected, and comprise overlap portions and non-overlap portions.

It is more common for manufacturing variation to be more prevalent between different chips than within the same chip. Thus, color unevenness that occurs in an image and that is caused by print head manufacturing variation is more easily perceived at a region printed by an overlap portion comprising a plurality of chips than at a region printed by a non-overlap portion.

FIGS. 7A to 7E illustrate the presence of brightness differences in an image, caused by manufacturing variation, in the case where the number of nozzles of each of the chips of the print head shown at FIG. 4A is set to 512, and where the number of nozzles of the overlap portions is set to 128. Note that the print head is set up such that, as in C_A0 shown at FIG. 4A, the number of nozzles of the non-overlap portion is 384 in the case where only one end of a chip is an overlap portion, and as in C_A1, the number of nozzles of the non-overlap portion is 256 in the case where both ends of the chip are overlap portions. Also, for the purpose of simplifying the explanation, the ejection amount of the chip CH0 has been made less than the ejection amount of the chip CH1, and the ejection amounts of the nozzles within each of the respective chips C_CH0 and C_CH1 have been made uniform. Furthermore, as shown at FIG. 5B, the nozzle usage rates are such that the nozzle usage rate of the chip C_CH0 and the nozzle usage rate of the chip C_CH1 cross 1 time.

FIG. 7A illustrates a case where HS processing and MCS processing are not applied. FIG. 7B illustrates a case where HS processing and MCS processing have been applied at 80 nozzle intervals. FIG. 7C illustrates a case where HS processing and MCS processing have been applied at 64 nozzle intervals, a common divisor of the 128 nozzles of the overlap portion C_T, the 384 nozzles of the non-overlap portion C_A0, and the 256 nozzles of the non-overlap portion C_A1. FIG. 7D illustrates a case where HS processing and MCS processing have been applied at 40 nozzle intervals, which is the number of nozzles of the overlap portion. FIG. 7E illustrates a case where HS processing and MCS processing have been applied at 32 nozzle intervals, a common divisor of the 128 nozzles of the overlap portion C_T, the 384 nozzles of the non-overlap portion C_A0, and the 256 nozzles of the non-overlap portion C_A1. The explanation of the embodiment was made with the easily comprehensible nozzle counts of FIGS. 7A to 7E, for the convenience of the figures, but it should be noted that the invention is not limited as such.

As shown at FIGS. 7B and 7D, in the case where the number of nozzles of the nozzle region that corresponds to the processing block of the HS process and the MCS process is made a number other than a common divisor of the overlap portions and the non-overlap portions, correction of the non-overlap portions is largely effected by the overlap portion, at which manufacturing variation is comparatively large. On the other hand, as shown at FIGS. 7C and 7E, when the number of nozzles of the nozzle region that corresponds to the processing block of the HS process and the MCS process is made a divisor of the number of nozzles of the overlap portions and a divisor of the number of nozzles of the non-overlap portions, influence from the overlap portion is small and it is possible to correct the non-overlap portions. By way of making the number of nozzles of the nozzle region that corresponds to the processing block of the HS process and the MCS process a divisor of the number of nozzles of the overlap portions and a divisor of the number of nozzles of the non-overlap portions, it is possible to implement a correction suited to the respective color differences of the overlap portions and the non-overlap portions. Note that, with respect to HS processing and MCS processing, it is effective, according to the degree of color difference caused by overlap portion and non-overlap portion manufacturing variation, to employ a processing block that is the smallest value among the common divisors, such as to increase the effect on visual perception.

There are cases where fluctuation occurs in the number of overlap portion nozzles and the number of non-overlap portion nozzles, due to manufacturing variation, and where a misalignment of the overlap portions and the non-overlap portions occurs between heads of different colors. In this case overlap portions and non-overlap portions are present within the nozzle region that corresponds to 1 processing block. Here, if the influence of the overlap portions on the non-overlap portions can not be visually recognized, a processing block change is not necessary. In the case where the influence of the overlap portions on the non-overlap portions can be visually recognized, however, from among the common divisors of the overlap portion nozzle count and the non-overlap portion nozzle count, a region that is not visually recognized and that has a smaller number of nozzles should be employed as the nozzle region that corresponds to the processing block.

In this embodiment explanation was made with the easily comprehensible nozzle counts of FIGS. 7A to 7E for the convenience of the figures but as described above it should be noted that it is effective to make the processing block a smaller number of nozzles. In the case of configuring the head of this embodiment, it is highly advantageous to apply HS processing and MCS processing at, for example, 8 nozzle intervals, a common divisor of the 128 nozzles of the overlap portion C_T, the 384 nozzles of the non-overlap portion C_A0, and the 256 nozzles of the non-overlap portion C_A1.

Figure 8A:
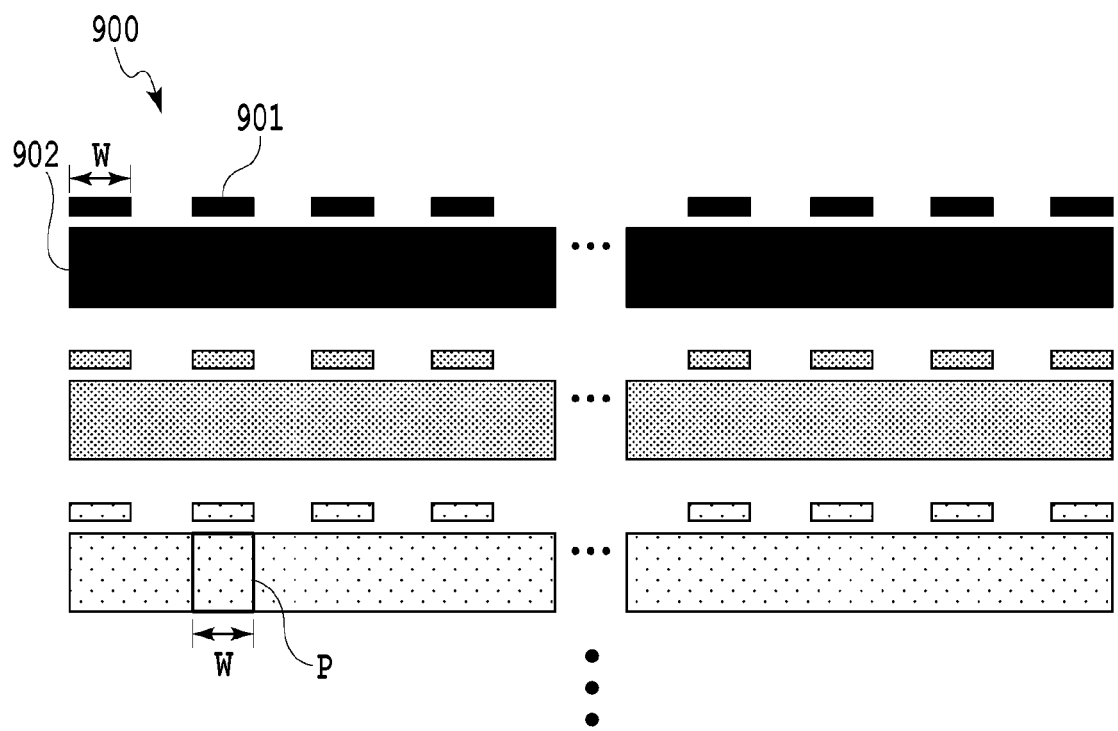
FIGS. 8A and 8B are diagrams that illustrate detection patterns of the first embodiment.
Figure 8B:
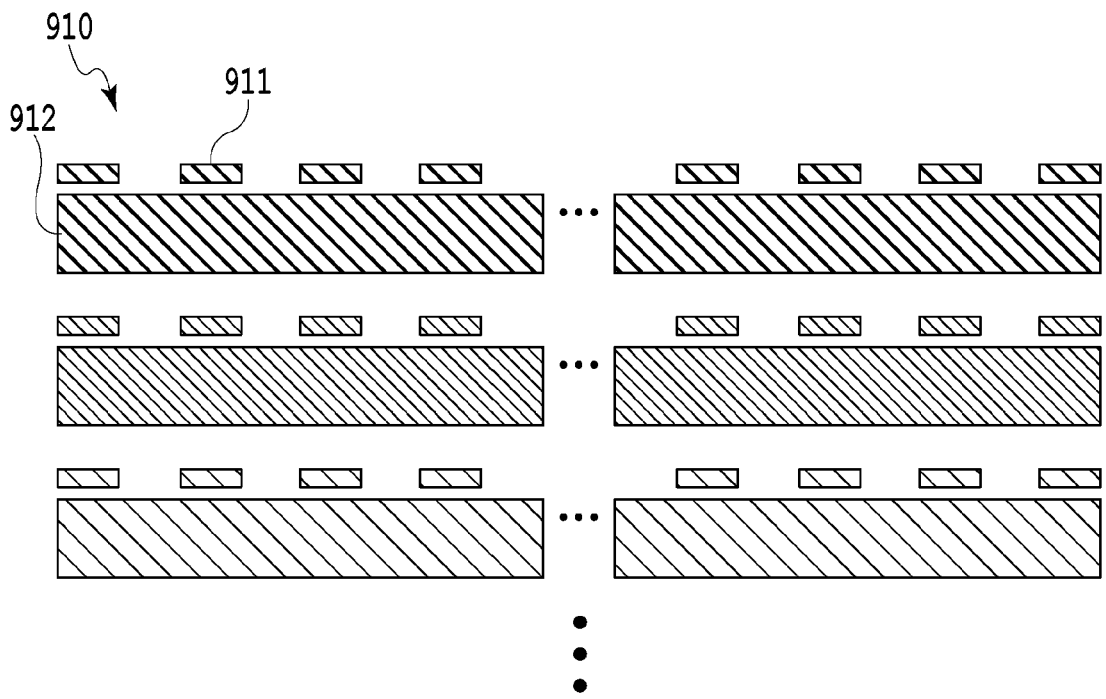

Setup of the processing block of the HS process and the MCS process will be explained next. FIGS. 8A and 8B illustrate a pattern for detecting color unevenness caused by head manufacturing variation. The pattern 900 shown at FIG. 8A is a pattern of primary colors (for example, C (cyan), M (magenta) and Y (yellow)). And the pattern 910 shown at FIG. 8B contains not only primary colors, but contains patterns of a second order, or higher, colors (for example, R (red), G (green) and B (blue)) that use a plurality of inks 901 is a pattern for detecting the processing block. Explanation will be made here using the previously described apt example of an 8 nozzle processing block.

The processing block detection patterns 901 and 911 have a width W of 8 nozzles at 1200 dpi. The processing block detection patterns 901 and 911 are light and shade patterns in which light and shade alternate at intervals of the width W. These light and shade patterns are read by the scanner 107 or a color measurement device, and the width W is detected. The processing block P is detected using the processing block detection patterns 901 and 911, and the detection region 902 of the primary color pattern 900 and the detection region 912 of the second order, or higher, color pattern 910, equivalent to the width W of the processing block P, is read by a scanner or a color measurement device. The processing details for the later described HS process and MCS process are established, for each processing block P, according to the read result.

Figure 9A:
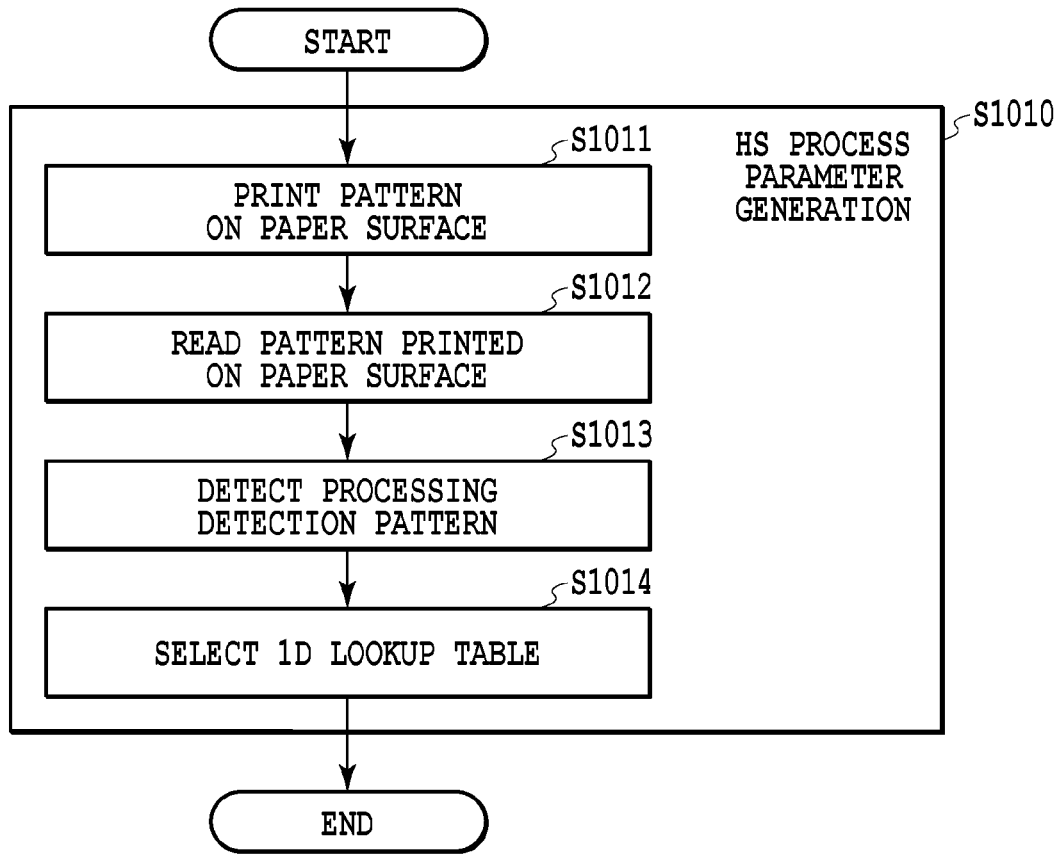
FIGS. 9A and 9B are flowcharts that illustrate HS processing.
Figure 9B:
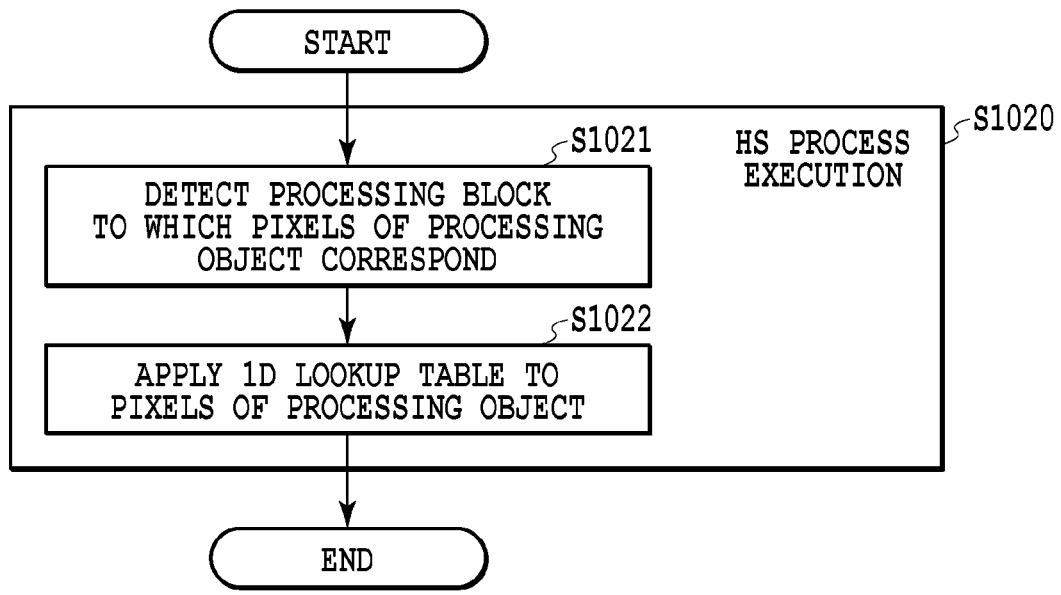

FIG. 9A is a flowchart that illustrates the process s1010 for generating HS processing parameters used at the HS processing unit 406 shown at FIG. 3. This process contains the respective steps s1011 to s1014. FIG. 9B is a flowchart that illustrates the HS execution process s1020, which contains step s1021 and step s1022.

The process flow of the HS process parameter generation process s1010 will be explained first. At step s1011 the pattern of FIG. 8A is printed on the print medium. The image processes implemented at the time of printing this pattern are uniform, and there are no parameter changes according to print location. At step 1012 the printed pattern is read by the scanner 107 or by a color measurement device. Hereafter an example will be explained wherein RGB values are read as color information by the scanner 107. Here, because the processing block is made 8 nozzles at 1200 dpi, reading takes place at a high resolution of 8 nozzles, or greater, at 1200 dpi. At step 1013 the processing block detection pattern is detected from the result read at step s1012, and the 8 nozzle region of the primary color pattern is set. At step s1014 an appropriate 1D lookup table is selected from among multiple 1D lookup tables, which are for the HS process and provided in advance, according to the RGB value of the previously set region. This selection of the 1D lookup table is carried out using a table that is provided in advance and that correlates the 1D lookup tables and the difference between the target RBG value and the RGB value read by the scanner. Setting of the 8-nozzle interval region, as described above, and selection of the 1D lookup table, is executed across the width of the long head.

The operations of the HS execution process s1020 will be explained next. At step s1021 it is determined to which processing block the pixels of the processing object correspond. Here, in the case where the resolution of the input pixels is 600 dpi, 1 input pixel corresponds to 2 output pixels at 1200 dpi. Thus, processing blocks are detected such that the process renews at data intervals of 4 input pixels. At step s1022, with respect to the detected processing block, the selected 1D lookup table is applied to the input image data of the processing object. Detection of the processing block corresponding to the input pixels as the processing target, and application of the 1D lookup tables, is executed for all of the input image data.

Figure 10A:
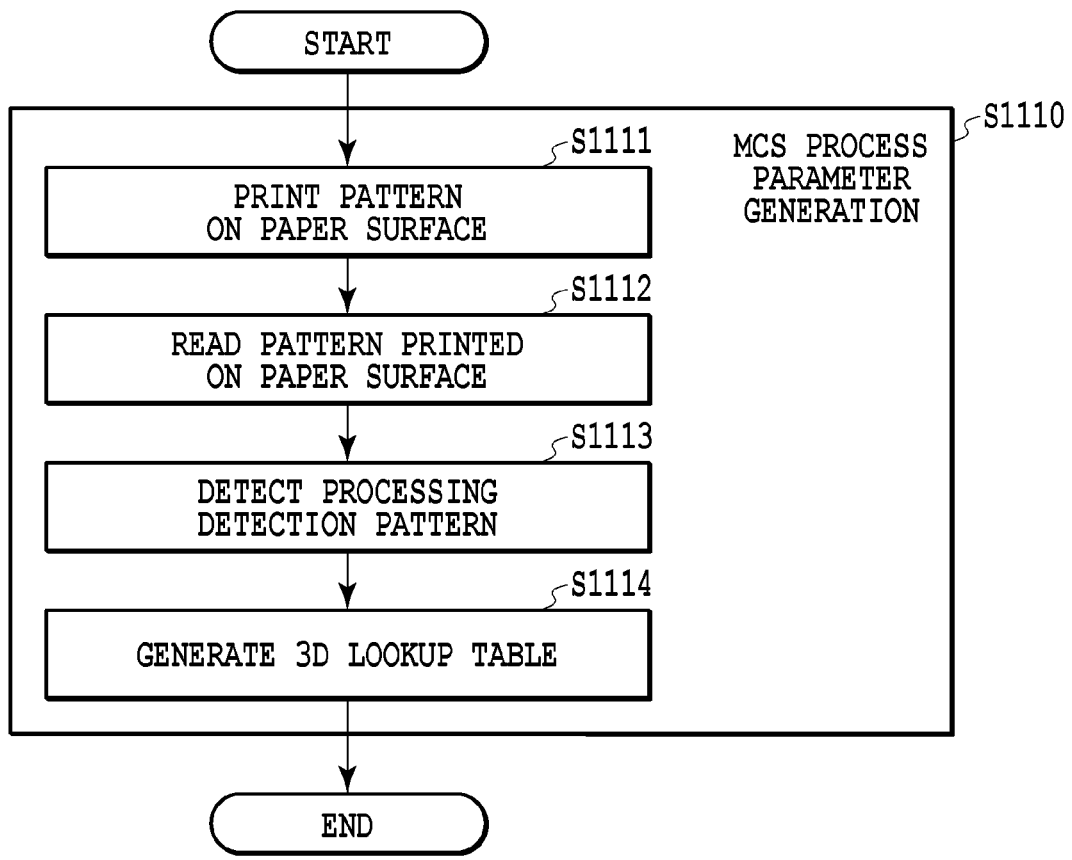
FIGS. 10A and 10B are flowcharts that illustrate multicolor shading (MCS) processing.
Figure 10B:
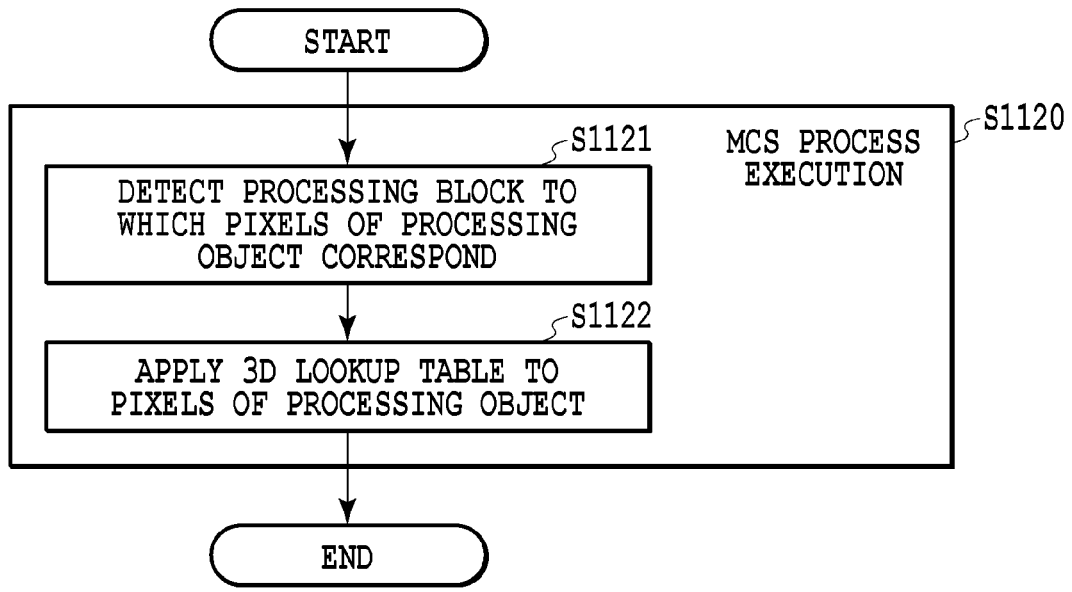

FIG. 10A is a flowchart that illustrates the process s1110 for generating MCS processing parameters used at the MCS processing unit 404 shown at FIG. 3, and this process contains the operations of steps s1111 to s1114. FIG. 10B is a flowchart that illustrates the MCS execution process s1120, which contains step s1121 and step s1122.

The process flow of the MCS process parameter generation process s1110 will be explained first. At step s1111 the pattern shown at FIG. 8B is printed on the print medium. In the process that is executed when this pattern is printed, the image data processed at the input color conversion processing unit 403 passes via the bypass route shown by the dotted line 410 of FIG. 3, and is input into the ink color conversion processing unit 405. Thus, in this case, MCS processing is not executed. At step 1112, the RGB values of the pattern printed at step s1111 are read by the scanner 107. Here, because the processing block is made 8 nozzles at 1200 dpi, reading takes place at a high resolution of 8 nozzles, or greater, at 1200 dpi. The processing block detection pattern is detected from the result read at step s1113, and the 8 nozzle region of the primary color pattern, or the second order, or higher, color pattern, is set. At step 1114, the 3D lookup table used at the MCS process is generated, for example, in the following manner according to the RGB values of the previously set region.

First, the pattern colors Rp, Gp, and Bp that are close to the target colors Rt, Gt, and Bt of the input device colors Rd, Gd, and Bd of the 3D lookup table of the MCS process are estimated based on the read RGB values. Next, the device colors Rn, Gn, and Bn, which correspond to the estimated pattern colors Rp, Gp, and Bp, are estimated. The target colors are, for example, pattern color RGB values (values read by the scanner) that correspond to the device colors Rd, Gd, and Bd in the case of printing by a print head in which ejection volume is a standard value. And, a table is generated that converts the device colors Rd, Gd and Bd, input into the input color conversion processing unit 403 of FIG. 3 when printing a pattern, into Rn, Gn and Bn. The 3D lookup table of the MCS process is generated by way of implementing this conversion table with respect to a plurality of patterns. Setting of the 8-nozzle interval nozzle region, and generation of the 3D lookup table, is executed across the width of the long head.

The operations of the MCS execution process s1120 shown at FIG. 10B will be explained next. At step s1121 it is determined to which processing block the pixels of the processing object correspond. Here, in the case where the resolution of the input pixels is 600 dpi, 1 input pixel corresponds to 2 output pixels at 1200 dpi. Thus, processing blocks are detected such that the MCS process can switch over to intervals of 4 input pixels. At step 1122 the 3D lookup table generated with respect to the detected processing block is applied to the input pixel image data of the processing object. This application of the 3D lookup table is implemented in an amount corresponding to the input pixels.

In this first embodiment, as explained above, image data that corresponds to a nozzle region that has a common divisor to the number of nozzles at the overlap portions and to the number of nozzles at the non-overlap portions is made the processing block, and the HS process and the MCS process are then executed. Accordingly, the boundaries of the nozzle regions that correspond to input image data of the processing block are established such as to coincide with the boundaries of the overlap portions and the non-overlap portions. Because of this, inside 1 processing block, intermingling of nozzles belonging to the overlap portions and nozzles belonging to the non-overlap portions disappears, and influence of the non-overlap portions on the overlap portions also disappears. Because of this it is possible to reduce image deterioration caused by color variation such as color unevenness or density unevenness caused by manufacturing variation. Furthermore, if there is not a change in head length, in the case where the resolution of the print head is made high, it is possible to suppress enlargement of the load and cost necessary for image processing because there is not a change in the number of processing blocks that switch parameters. And, even where the resolution of the print head is made high, it is not necessary to make high the resolution of the detection device, such as a scanner, etc. In other words, it is possible to reduce color difference caused by manufacturing variation, regardless of the resolution of the print head.

Second Embodiment

A second embodiment of the invention will be explained next.

Figure 11:
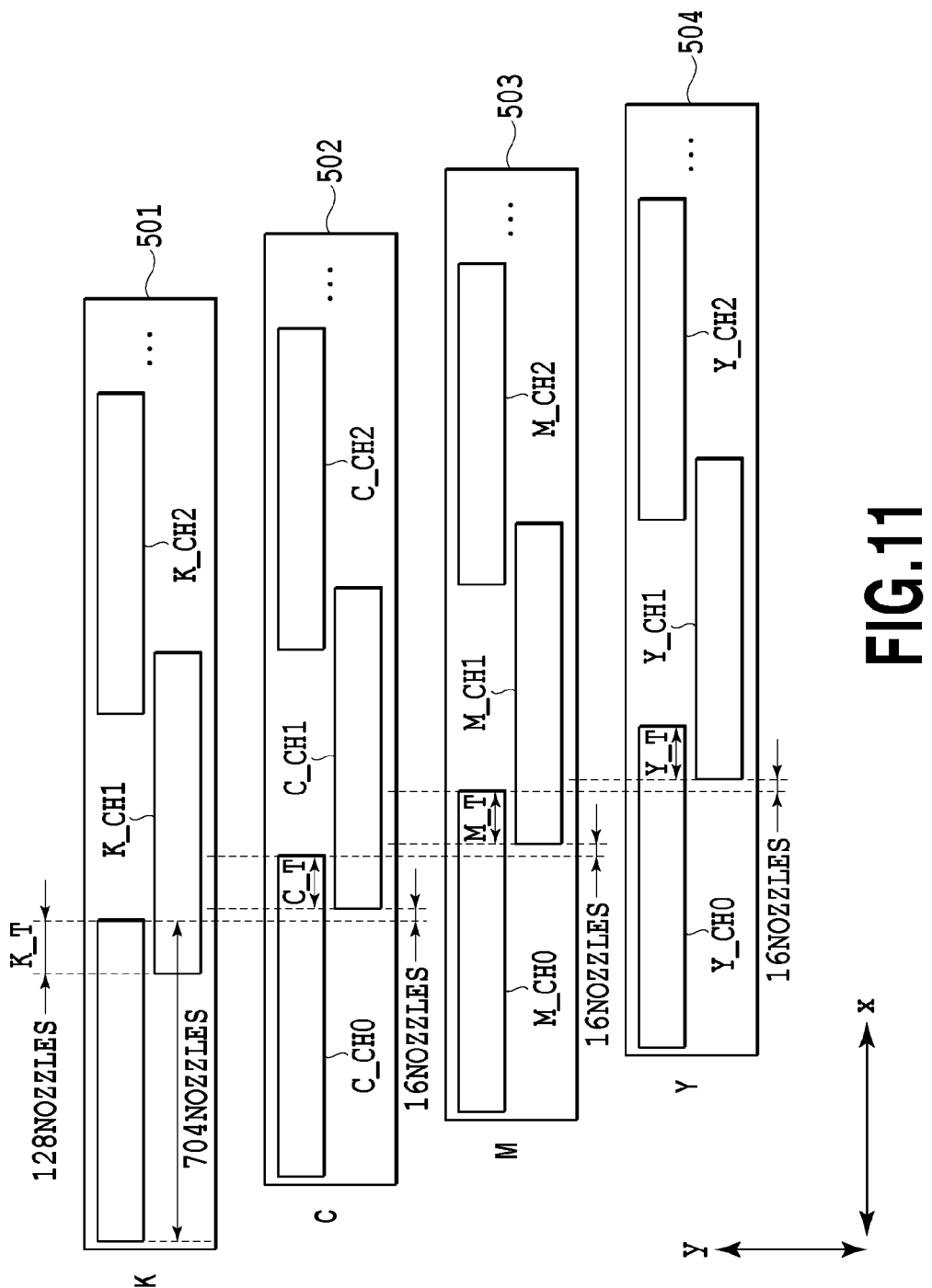
FIG. 11 is an explanatory diagram that illustrates the configuration of the print heads used in a second embodiment.

FIG. 11 is diagram that illustrates print heads 501 to 504, which are used in the second embodiment and which differ in the following respects from the print heads used in the above described first embodiment illustrated at FIGS. 4A and 4B. That is, the print heads used in the above described first embodiment are configured such that the overlap portions of the print heads of each color overlap in the conveyance direction of the print medium (Y direction) (they are present at the same position along the nozzle alignment direction (x direction)). In contrast, the print heads of the second embodiment have a configuration wherein, as shown at FIG. 11, the overlap portions of the print heads of each color, K_T, C_T, M_T, and Y_T, are arranged such that they do not overlap in the conveyance direction of the print medium (y direction).

Figure 12A:
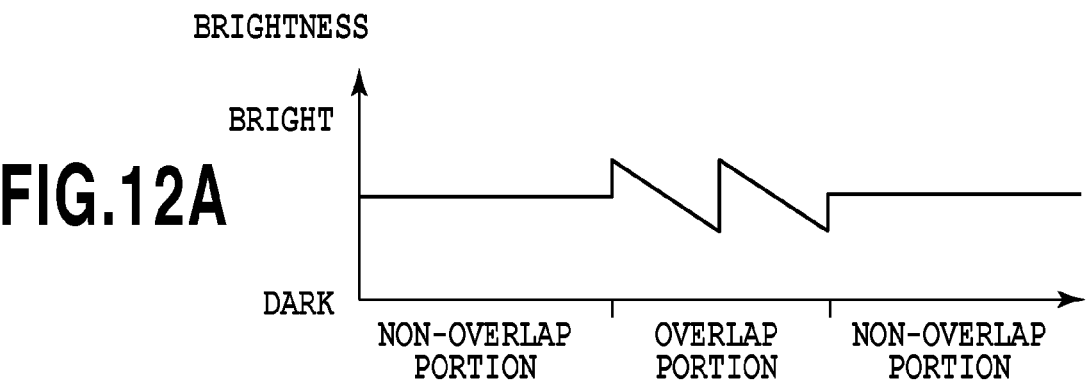
FIGS. 12A to 12C are diagrams that illustrate brightness at the overlap portions and non-overlap portions of the print heads of the second embodiment.

Now, at each of the print heads shown at FIG. 11, nozzle resolution is 1200 dpi, the nozzle count of each chip is 704, the nozzle count at the overlap portions are 128, and the number of nozzles at the portions located between the overlap portions of adjacent print heads of different colors is 16. A portion located between the overlap portions of adjacent print heads of different colors will be hereafter referred to as an "offset portion." Here, based on the head K, in similar fashion to FIG. 7C of the first embodiment, when HS processing is implemented at 64 nozzle intervals, a color difference (density unevenness) reduction effect, similar to that of the first embodiment, is exhibited with respect to the image printed by head K, that is, with respect to the monochrome image, as shown at FIG. 12A.

Figure 12B:
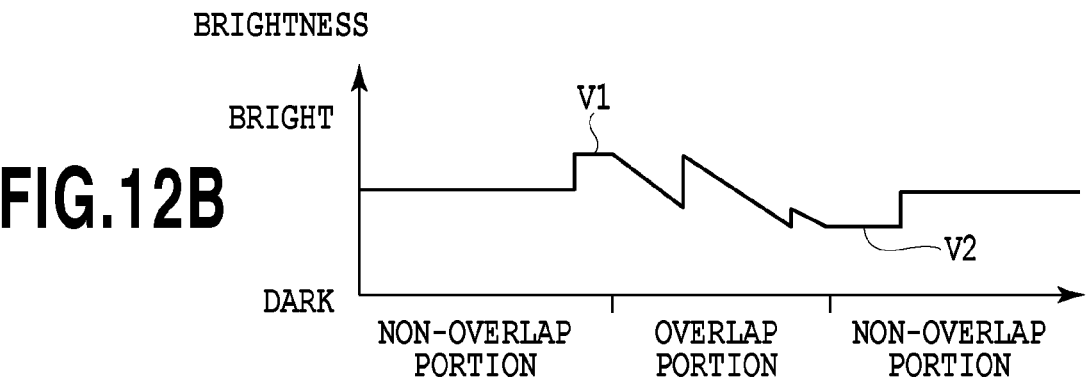

In contrast to this, with respect to other heads as shown at FIG. 12B, there is a case in which the MCS processing block is setup such as to include both overlap portions and non-overlap portions. Accordingly there are times when the effect of correcting color unevenness is reduced. That is, at the print head shown at FIG. 12B, in the case where the processing block of the MCS process is made 64 nozzles in the same manner as FIG. 7C of the first embodiment, the above mentioned offset portion is present between the overlap portions of each of the print heads, cyan (C), magenta (M), and yellow (Y). For this reason, in the case of forming a multicolored image using a plurality of print heads, there are times when both overlap portions and non-overlap portions are contained within the processing block of the MCS processes of the plurality of print heads used in the formation of that image. In this case, the image data of the image formed by the offset portions present within the same processing block, and the other portions within the same processing block, are correction-processed at the same correction value (parameter). For this reason, as in the above described first embodiment, in comparison to case where MCS processing is carried out separately while switching between the overlap portions and non-overlap portions, decline of the color unevenness reducing effect is possible. FIG. 12B shows this state and within the figure the portions marked V1 and V2 indicate portions where MCS processing is not performed suitably.

Figure 12C:
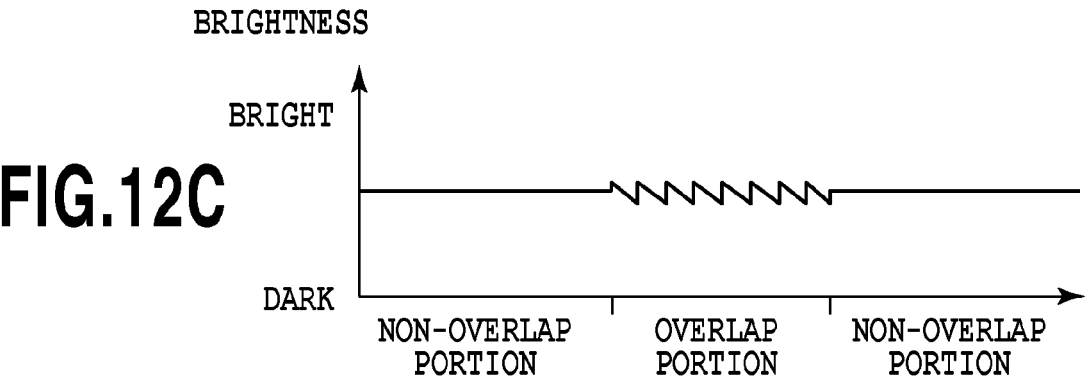

Therefore, in the second embodiment, 16 nozzles, which is a common divisor of the 128 nozzles of the overlap portion and the 16 nozzles of the offset portion, is set as the nozzle region that corresponds to the processing block. Accordingly, it is possible to switch the processing block and separately correct the respective image data in response to the switch between processing images printed by the overlap portions and processing images printed by the non-overlap portions, similar to the first embodiment. FIG. 12C illustrates one example of the state of the correction process performed at the second embodiment. The explanation of this embodiment was made with the easily comprehensible nozzle counts of FIGS. 12A to 12C for the convenience of the figures, but it should be noted that the invention is not limited as such.

Note that because in the HS process correction is capable of being processed for individual colors, it is effective to set image data that corresponds to a nozzle region having a common divisor of the overlap portions and non-overlap portions of each of the print heads as the processing block. On the other hand, the MCS process uses image data of an image formed by a plurality of ink colors. For this reason, it is effective to set a number of nozzles that is a common divisor of the number of nozzles of the offset portion, which is the portion between the overlap portions of adjacent print heads, such as described above, and of the number of nozzles of the overlap portions, as a nozzle region, and to make the image data corresponding to this nozzle region the processing block.

Note that, with respect to HS processing and MCS processing, it is effective, according to the degree of color difference caused by overlap portion, non-overlap portion, and offset portion manufacturing variation, to employ a processing block that is the smallest value among the common divisors, such as to increase the effect on visual perception. And there are cases where, depending on the nozzle counts at the overlap portions and the nozzle counts at the non-overlap portions of the respective print heads shown at FIG. 11, mispositioning due to manufacturing variation occurs. In this case it is possible to increase the effect of reducing color unevenness by way of employing a smaller value from among the above described common divisors.

In this embodiment explanation was made with the easily comprehensible nozzle counts of FIGS. 7A to 7E for the convenience of the figures but as described above it should be noted that it is effective to make the processing block a smaller number of nozzles. In the case of configuring the head of this embodiment, it is highly advantageous to apply HS processing and MCS processing at 8 nozzle intervals, a common divisor of the 128 nozzles of the overlap portions and the 16 nozzles of the offset portion.

As explained above, according to the second embodiment, in the execution of the HS process, the MCS process, or both processes, image data that corresponds to a nozzle region that has a common divisor of the nozzle count of the overlap portions and the nozzle count of the offset portions is made the processing block. Accordingly, the boundaries of the nozzle regions that correspond to input image data of the processing block are established such as to coincide with the boundaries of the overlap portions and the non-overlap portions. Because of this, in the present embodiment as well, inside 1 processing block, intermingling of nozzles belonging to the overlap portions and nozzles belonging to the non-overlap portions disappears, and influence of the non-overlap portions on the overlap portions also disappears. Because of this it is possible to increase the effect of reducing the color difference generated by manufacturing variation. Furthermore, in this second embodiment, because processes are executed at a plurality of nozzles in a similar manner as that of the above described first embodiment, it is possible to greatly improve the processing speed of the HS process and the MCS process in comparison to the case where processing is executed per each nozzle. And it is also possible to reduce memory capacity needed in processing.

Third Embodiment

A third embodiment of the invention will be explained next.

At the above described first and second embodiments examples were explained wherein one processing block was established with respect to the HS processing and the MCS processing of the image data corresponding to the nozzles of the print head. In contrast, in the third embodiment a plurality of differing processing blocks are established as the processing blocks of the image data corresponding to the nozzles of the print head.

Here, the print heads of each color shown at FIG. 4A are designed to be a structure in which the nozzle count of each chip is 512 and the nozzle counts at the overlap portions are 128. In the third embodiment, with respect to the overlap portions, HS processing and MCS processing are executed at 8 nozzle intervals, which is a divisor of its nozzle count of 128. And, with respect to the non-overlap portions, 16 nozzles are set as the nozzle region, which 16 nozzles are a common divisor of the 384 nozzles of the non-overlap portions of the chips located at the ends of the print head, and the 256 nozzles of the non-overlap portions of the chips not located at the ends. HS processing and MCS processing are thus executed at image data intervals corresponding to these nozzle regions. Accordingly, similarly to the first embodiment, the processing block is capable of switching in response to the switch between processing the image printed by overlap portions and processing the image printed by non-overlap portions, and it is possible to obtain a color difference reduction effect similar to that of the first embodiment.

And, in the case where there is an error in the number of nozzles, in contrast to the planned number of nozzles at an overlap portion, due to a manufacturing error, it is possible to increase the color unevenness reduction effect by way of employing a smaller number of nozzles from among the divisors of the nozzle counts of the overlap portion. The same is true with respect to the non-overlap portions. In the case of manufacturing variation, it is possible to increase the color unevenness reduction effect by way of employing a smaller nozzle count, from among the common divisors of the non-overlap portions, as the nozzle region that corresponds to the processing block.

In this third embodiment, as explained above, 2 or more divisors of the nozzle counts of the overlap portions, and a separate number that differs therefrom, are respectively made nozzle regions, and HS process and the MCS process are performed with the image data that corresponds to the respective nozzle regions as the processing blocks. At this time, with respect to at least the overlap portions, a divisor of the number of nozzles of the overlap portions is set as the nozzle region, and HS processing and MCS processing are executed with the image data that corresponds to that nozzle region as the processing block. Accordingly, it is possible to increase the effect of reducing the color difference generated by manufacturing variation. And, in addition to the configuration of the print head such as that described above, it is also possible to establish multiple different processing blocks such as to be able to switch the processing block of the HS process and the MCS process in response to a switch between overlap portions and non-overlap portions. At this time, with respect to at least the overlap portions, it is necessary that a number of nozzles that is a divisor of the number of nozzles of the overlap portions is set as the nozzle region, and HS processing and MCS processing are executed with the image data that corresponds to that nozzle region as the processing block. Furthermore, as described at the first embodiment, manufacturing variation at the overlap portions are relatively large in comparison to the non-overlap portions. Thus, as in the above described example, it is preferable to make the number of nozzles that corresponds to the processing block of the overlap portions smaller than the number of nozzles that corresponds to the processing block of the non-overlap portions. Accordingly, as for the non-overlap portions at which variation is comparatively small, it is possible to reduce the number of tables used in HS processing and MCS processing, and it is possible to restrain the enlargement of memory and processing speed.

At the first through third embodiments, in the HS processing or MCS processing of the image data that corresponds to the nozzles of at least the overlap portions, examples were illustrated in which image data corresponding to a nozzle region having a number of nozzles that is a divisor of the number of nozzles of the connection portions is set as the processing block. In contrast, in the fourth embodiment, when setting the nozzle regions that correspond to the processing block, without using a divisor of the nozzle count of the overlap portions, nozzle regions are set that have pluralities of nozzles of differing nozzle counts.

Here, the print heads of FIG. 4A are designed to be a structure in which the nozzle count of each chip is 512 and the nozzle counts at the overlap portions are 128. With respect to the overlap portions of this print head, numbers of nozzles that become the same number as the 128 nozzles of the overlap portions when added, are set as processing blocks, for example, 8 processing blocks of 7 nozzles and 8 processing blocks of 9 nozzles, and HS processing and MCS processing are executed. On the other hand, with respect to the non-overlap portions, HS processing and MCS processing are executed at image data intervals corresponding to a nozzle region having 16 nozzles, which is a common divisor of the 384 nozzles and the 256 nozzles of the non-overlap portions. Accordingly, it is also possible to switch the processing block of the image data in response to the switch between processing the image printed by overlap portions and processing the image printed by non-overlap portions, similar to the first embodiment.

Besides this, also with respect to the non-overlap portions, similar to the previously described overlap portions, pluralities of nozzles, of differing nozzle counts, the sum of which is the number of nozzles of the non-overlap portion, may be made nozzle regions, and image data corresponding to each nozzle region may be made the processing blocks. Note that, in the case where there is an error in the number of nozzles, in contrast to the planned number of nozzles at an overlap portion, due to manufacturing error, nozzle regions comprising pluralities of nozzles different than the example described above may be established, and that the image date corresponding thereto may be set as processing blocks.

As explained above, with respect to the overlap portions, image processing for the overlap portions is executed using multiple processing blocks of differing nozzle counts. Here, by lining up processing blocks corresponding to nozzles of differing counts such that the sum total of the nozzles of each of the processing blocks coincides with the number of nozzles of the overlap portions, it is possible to increase the effect of reducing color unevenness caused by manufacturing variation.

Fifth Embodiment

A fifth embodiment of the invention will be explained next.

In the first through fourth embodiments, cases wherein the processing blocks of the HS processing and MCS processing of image data were switched in response to a switch between overlap portions and non-overlap portions were employed and explained as examples. In contrast, the fifth embodiment employs a configuration wherein switching between overlap portions and non-overlap portions does not coincide with switching of the processing block.

Here, the print heads are such as those displayed at FIG. 4A, and are designed to be structures in which the nozzle count of each chip is 512 and the nozzle counts at the overlap portions are 128. In this case, in this embodiment, the processing blocks of the image data corresponding to the overlap portions are setup as shown at FIG. 13.

Figure 13:
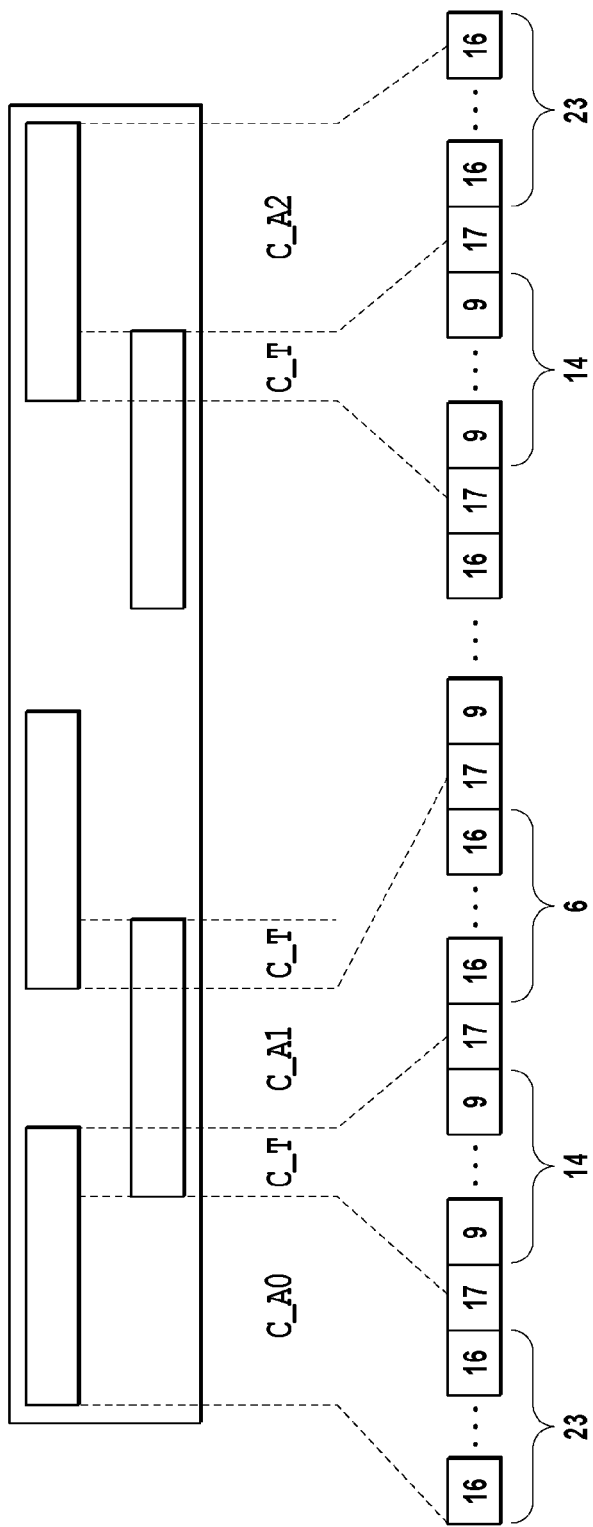
FIG. 13 is a diagram that explains the processing blocks of a fifth embodiment.

FIG. 13 is a diagram illustrating one example of setting up the processing blocks of this embodiment. In the figures, the numbers inside the boxes indicate the number of nozzles of the processing blocks. At C_A0, twenty three 16-nozzle processing blocks are separately established, and at C_T fourteen 9-nozzle processing blocks are separately established. And one 17-nozzle processing block is separately established such as to include the boundaries of C_A0 and C_T. And at C_T and C_A1, one 17-nozzle processing block is separately established such as to include the boundaries of C_T and C_A1, and at C_A1 six 16-nozzle processing blocks are separately established. At C_T and C_A2, one 17-nozzle processing block is separately established such as to include the boundaries of C_T and C_A2, and at C_A2 twenty three 16-nozzle processing blocks are separately established.

Note that, in the case where there is an error in the number of nozzles, in contrast to the planned number of nozzles at an overlap portion, due to manufacturing error, nozzle counts other than those of the example described above may be suitably employed as processing blocks.

As described above, in the fifth embodiment, overlap portions and non-overlap portions are present in one processing block. For this reason, there is an influence of the overlap portion, having comparatively large manufacturing variation, on the correction of the non-overlap portions, and there is a fear that this will generate color differences such as color and density unevenness. However, in this fifth embodiment, because values that are close to the nozzle counts of the other embodiments described above are used as the processing blocks, it is difficult for color difference caused by the presence of the overlap portion and the non-overlap portion within one processing block to stand out visually. Thus, in this fifth embodiment as well, it is possible to reduce color difference caused by manufacturing variation, by way of correcting image data at each processing block.

Note that although in the above first through fifth embodiments cases of executing HS processing and MCS processing were explained, the respective process details were certainly examples, and the invention is capable of being applied to other processes that perform the reduction of color difference. And, although examples were explained wherein the MCS process corrected RGB values of image data to other RGB values, the invention also encompasses methods wherein RGB values are corrected to CMYK values and methods wherein CMYK values are corrected to other CMYK values.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-225744, filed Oct. 5, 2010, which is hereby incorporated by reference herein in its entirety.

What is claimed is:

1. An inkjet printing apparatus that prints images on a print medium by ejecting ink from nozzles based on print data generated in response to input image data, said inkjet printing apparatus comprising:
   at least one print head that is provided with a plurality of chips, said plurality of chips each having at least one nozzle array comprising a plurality of nozzles that eject ink, the nozzle array of each chip having an overlap portion and a non-overlap portion, wherein a print region printed by an overlap portion of a nozzle array of one chip overlaps a print region printed by an overlap portion of a nozzle array of an adjacent chip adjacent to the one chip, and wherein a print region printed by the non-overlap portion of the nozzle array of the one chip does not overlap a print region printed by the non-overlap portion of the nozzle array of the adjacent chip; and
   a correction unit that sets input image data, which correspond to nozzle regions that are defined in said nozzle arrays in an alignment direction of the nozzles and each of the nozzle regions comprising a plurality of nozzles, as processing blocks, and corrects the input image data according to parameters that are defined for each of the processing blocks,
   wherein each of the parameters corresponds to the plurality of nozzles of a respective one of the nozzle regions,
   wherein the plurality of nozzle regions are defined on each of the non-overlap portions of the nozzle arrays of the one chip, and with regard to the overlap portions, the adjacent chip and the overlap portions of the nozzle arrays of the one chip and the adjacent chip, and with regard to the overlap portions, the correction unit sets the image data each corresponding to nozzle regions equivalent to 2 or more numbers of divisors of a number of nozzles of the overlap portions of the nozzle arrays in the alignment direction as the processing blocks, respectively, and
   wherein boundaries between the nozzle regions that correspond to the input image data of the processing blocks and abut with each other in the alignment direction are defined according to the positions of the boundaries of the overlap portions and non-overlap portions on the print head.

2. An inkjet printing apparatus according to claim 1, wherein the processing blocks are image data corresponding to nozzle regions equivalent to 2 or more numbers of nozzles that are common divisors of the number of nozzles of said overlap portions and the number of nozzles of said non-overlap portions.

3. An inkjet printing apparatus according to claim 1, wherein at least 2 among a plurality of said print heads are aligned such that the overlap portions respectively provided thereon do not overlap in a direction perpendicular to the alignment direction of said nozzles, and wherein the processing blocks are image data that correspond to nozzle regions comprising 2 or more numbers of nozzles that are common divisors of the number of nozzles aligned between said overlap portions of said at least 2 print heads aligned such that their overlap portions do not overlap, and of the number of nozzles of the overlap portions.

4. An inkjet printing apparatus according to claim 1, wherein the processing blocks contain input image data corresponding to nozzle regions equivalent to 2 or more numbers of nozzles that are divisors of the number of nozzles of the overlap portions, and contain input image data corresponding to nozzle regions equivalent to 2 or more numbers of nozzles that are divisors of the number of nozzles of the non-overlap portions.

5. An inkjet printing apparatus according to claim 1, wherein said correction unit performs correction based on ink ejection characteristics of the nozzles of the nozzle regions corresponding to the processing blocks.

6. An inkjet printing apparatus according to claim 1, further comprising:
   a color information acquisition unit configured to, at each of the processing blocks, acquire color information of an image formed on the print medium by said print head; and
   a parameter generation unit configured to generate the parameters that correspond to the processing blocks, based on the color information acquired by said color information acquisition unit.

7. An inkjet printing apparatus according to claim 1, wherein each of the parameters is for determining an output value of a color element, the output value corresponding to an input value of a color signal of a color element.

8. An inkjet printing apparatus according to claim 1, wherein the parameters are parameters for determining output values of a plurality of color elements, the output values corresponding to input values of color signals of a plurality of color elements.

9. An image processing apparatus for input image data processing for performing printing using at least one print head that is provided with a plurality of chips, the plurality of chips each having at least one nozzle array comprising a plurality of nozzles that eject ink, the nozzle array of each chip having an overlap portion and a non-overlap portion, wherein a print region printed by an overlap portion of a nozzle array of one chip overlaps a print region printed by an overlap portion of a nozzle array of an adjacent chip adjacent to the one chip, and wherein a print region printed by the non-overlap portion of the nozzle array of the one chip does not overlap a print region printed by the non-overlap portion of the nozzle array of the adjacent chip, said image processing apparatus comprising:
   a correction unit that sets input image data, which correspond to nozzle regions that are defined in the nozzle arrays in an alignment direction of the nozzles and each of the nozzle regions comprising a plurality of nozzles, as processing blocks, and corrects the input image data according to parameters that are defined for each of the processing blocks,
   wherein each of the parameters corresponds to the plurality of nozzles of a respective one of the nozzle regions,
   wherein the plurality of nozzle regions are defined on each of the non-overlap portions of the nozzle arrays of the one chip and the adjacent chip and the overlap portions of the nozzle arrays of the one chip and the adjacent chip, and with regard to the overlap portions, the correction unit sets the image data each corresponding to nozzle regions equivalent to 2 or more numbers of divisors of a number of nozzles of the overlap portions of the nozzle arrays in the alignment direction as the processing blocks, respectively, and
   wherein boundaries between the nozzle regions that correspond to the input image data of the processing blocks and abut with each other in the alignment direction are defined according to the positions of the boundaries of the overlap portions and non-overlap portions on the print head.

10. An image processing apparatus according to claim 9, wherein each of the parameters is for determining an output value of a color element, the output value corresponding to an input value of a color signal of a color element.

11. An image processing apparatus according to claim 9, wherein the parameters are parameters for determining output values of a plurality of color elements, the output values corresponding to input values of color signals of a plurality of color elements.

* * * * *